United States Patent [19]

St. Clair et al.

[11] 4,180,648

[45] Dec. 25, 1979

[54] CRYSTALLINE POLYIMIDES

[75] Inventors: Terry L. St. Clair; Anne K. St. Clair, both of Poquoson, Va.

[73] Assignee: The United States of America as represented by the Administrator of the National Aeronautics and Space Administration, Washington, D.C.

[21] Appl. No.: 906,299

[22] Filed: May 15, 1978

[51] Int. Cl.² ............................................ C08G 73/10
[52] U.S. Cl. .................................... 528/207; 528/208
[58] Field of Search .................. 260/47 CD, 28 TF; 528/206, 208

[56] References Cited

U.S. PATENT DOCUMENTS

| | | | |
|---|---|---|---|
| 3,833,546 | 9/1974 | Takekoshi et al. | 260/47 CP |
| 3,847,867 | 11/1974 | Heath et al. | 260/47 CP |
| 3,850,885 | 11/1974 | Takekoshi et al. | 260/47 CZ |
| 3,983,093 | 9/1976 | Williams et al. | 260/47 CP |
| 3,989,670 | 11/1976 | Takekoshi et al. | 260/47 CP |
| 3,991,004 | 11/1976 | Takekoshi et al. | 260/37 N |

*Primary Examiner*—Lester L. Lee
*Attorney, Agent, or Firm*—Wallace J. Nelson; John R. Manning; Howard J. Osborn

[57] ABSTRACT

Novel aromatic crystalline polimides are disclosed that are synthesized from polyamide-acid and when heated to 200° to 300° C. become cyclized to afford an opaque polymer which by X-ray diffraction of the unoriented film exhibited 47 percent crystallinity. Differential Scanning Calorimetry (DSC) indicates a melt at 425° C. with no glass transition in these crystalline polyimides.

4 Claims, No Drawings

CRYSTALLINE POLYIMIDES

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

Polyimides are high temperature, amorphous polymers that are finding applications as adhesives and composite matrix resins. At present, no suitable polyimide exists for use as a composite reinforcement fiber or fabric because of the amorphous nature of this polymer class. In order to meet the high tensile strength (HTS) and high modulus (HM) requirements of a reinforcement the polymer must exhibit either crystallinity or a high degree of order which is usually induced by drawing or extruding.

Presently the only suitable reinforcements for high temperature composite systems are glass and graphite fibers. Other HTS and HM systems such as Dupont's Kevlar (or PRD-49) cannot withstand the temperature requirement for processing high temperature matrix resins. A need for a high temperature strength, high modulus polyimide reinforcement exists not only because of its ability to withstand high processing temperatures, but also, because the glass and graphite fibers form weak bonds with the matrix resin. Since many of these matrix resins are polyimides, polyimide fibers should be more compatible and stronger bonds should be formed.

BRIEF DESCRIPTION OF THE INVENTION

A highly crystalline polyimide has been discovered and prepared by reacting 4,4'-bis-(3,4-dicarboxyphenoxy)diphenylsulfide dianhydride (BDSDA) with p-phenylenediamine (PDA) in dimethylacetamide (DMAc) and then thermally cyclizing the resulting polyamide-acid to the corresponding polyimide (BDSDA-PDA).

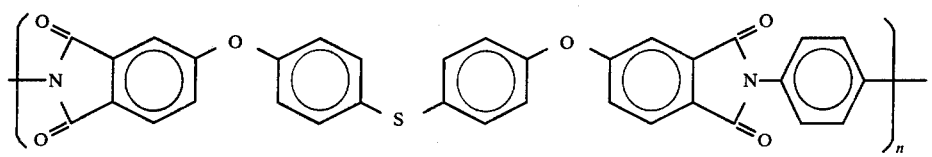

BDSDA - PDA where n is > 10

The polymerization of this polyimide was achieved at room temperature in freshly distilled DMAc at 15 percent solids using purified monomers. The resulting amide-acid solutions from several preparations had inherent viscosities when run at 0.5 percent solids in DMAc (35° C.) of 1.3 to 1.7.

Another crystalline polyimide, as observed by differential scanning calorimetry melt, was synthesized from BDSDA and benzidine (BDSDA-benzidine).

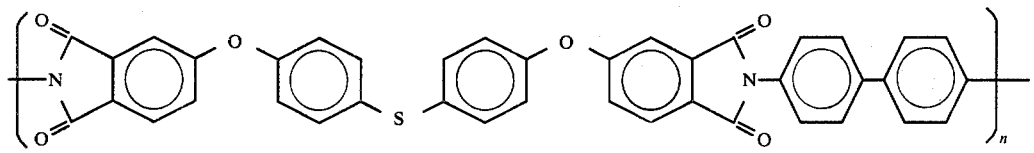

where n is > 10        BDSDA - BENZIDINE

Other polymers containing BDSDA and diamines with all para linkages may also possess some degree of crystallinity. Although only one solvent, DMAc, was used for these polymerizations, other solvents could also conceivably be used, especially those of the amide type. The dianhydride (BDSDA) or the diamines, PDA and benzidine, used in other polyimide formulations do not yield crystalline polyimides. Some examples of polyimides that have proved to be noncrystalline include:

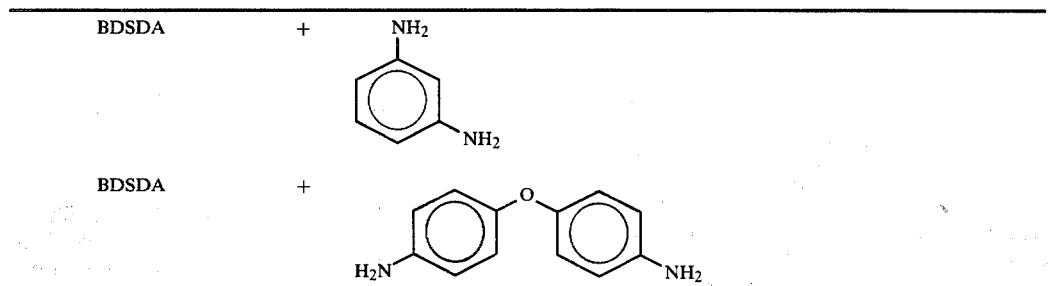

-continued

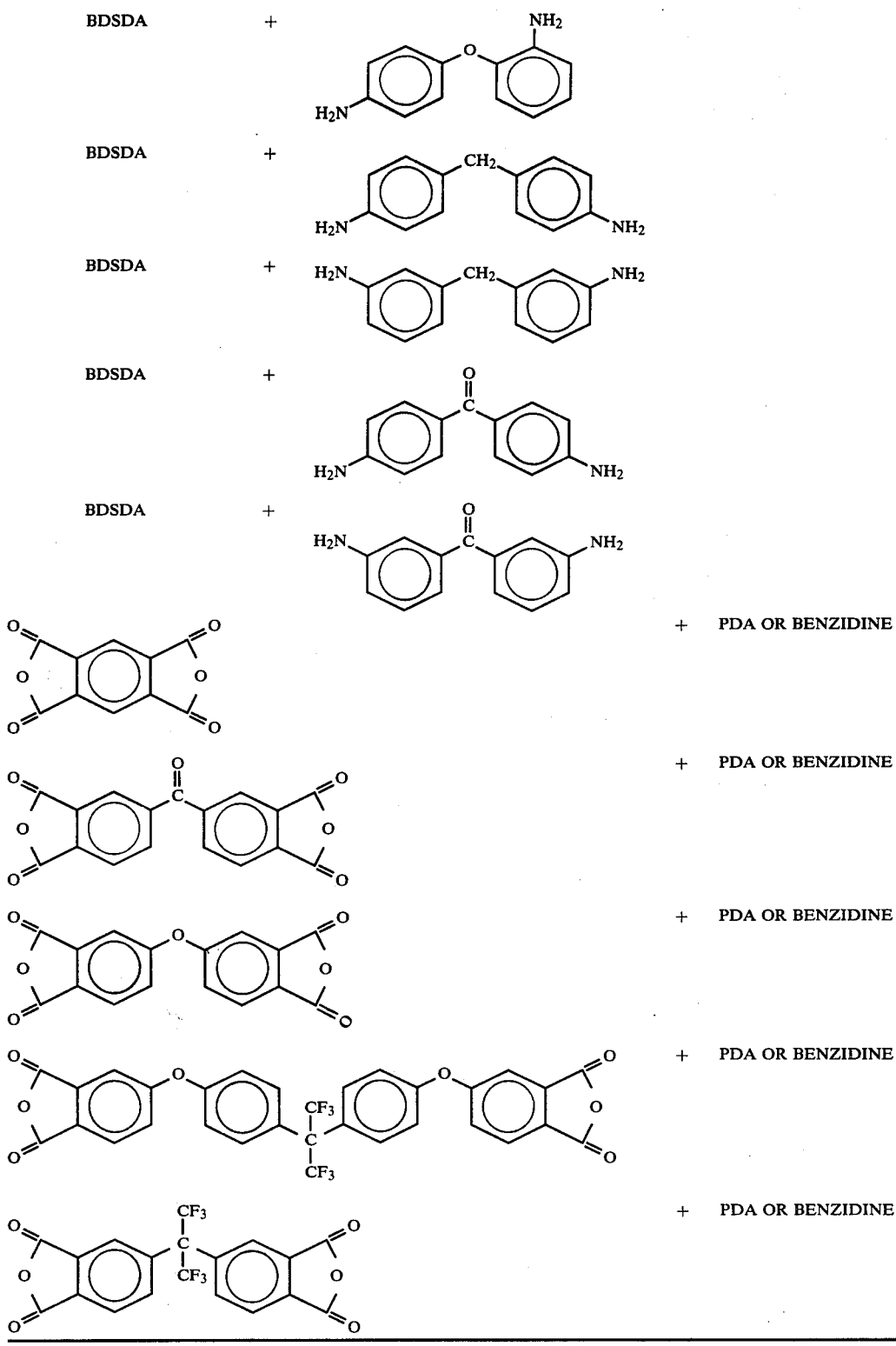

In the only two cases where crystalline polyimides were discovered, the polyamide-acids were evidently of a highly extended rod-like structure in solution, thus allowing crystallization upon loss of solvent and subsequent cyclization to the polyimide. The crystallization began to be noticable (as evidenced by opaqueness) in the temperature region of 190° C. Differential scanning calorimeter (DCS) traces of the crystalline films cured to 300° C. exhibited intense endothermic crystalline melts. The melting maximum by DSC for the BDSDA- PDA polyimide is 426° C. and for BDSDA-benzidine 480° C. After melting, both materials become amorphous with glass transition temperatures of 226° C. and 285° C. respectively.

The X-ray diffraction pattern of the BDSDA-PDA polyimide indicated that this polymer was 47 percent crystalline with peaks occurring at 27.60 Å, 5.09 Å, 4.37 Å and 3.72 Å.

Torsional braid analysis (TBA) of BDSDA-PDA showed a glassy transition to be absent on the room temperature to 450° C. run, but the cool-down curve exhibited a sharp glass transition at 230° C. indicating the material was initially crystalline and became amorphous upon melting. This same phenomenon occurred when a sample of the crystalline film was run in clamps on a Thermomechanical Analyzer (TMA). The initial film stretching occurred on melting at 425° C. and after cooling and reheating the stretching occurred at 238° C. (Tg).

SPECIFIC EXAMPLES

Example I. A solution of 5.1048 g of BDSDA and 1.0815 g of PDA in 35.02 g of DMAc was prepared in a 75 ml serum bottle under a nitrogen atmosphere. This solution was stirred with a magnetic stirring bar and began to build up viscosity as the reactants dissolved. The solution was stirred overnight at room temperature and then a film of this mixture was cast at 0.020 in on plate glass. The cast film was placed in a dry box and heated to 40° C. to evaporate the solvent. It was then cured for one hour at 100° C., one hour at 200° C. and one hour at 300° C. After slow cooling to room temperature the film was removed from the glass. It was opaque and brittle, which is characteristic of crystalline polymers. The inherent viscosity of the solution was 1.42 (0.5 percent solids at 35° C.) indicating a high molecular weight for this polymer system.

Example II. A solution of 0.5105 g of BDSDA and 0.1842 g of benzidine in 3.937 g of DMAc was prepared in a 15 ml serum bottle under nitrogen atmosphere. This solution was stirred with a magnetic stirring bar and a build up in viscosity was observed shortly after the monomers dissolved. The solution was stirred overnight and a film of the mixture was cast at 0.015 in on plate glass. The solution viscosity for this formulation was 1.30 (0.5 percent solids at 35° C.). After the film was air dried at 40° C. for two hours, it was placed in an air oven and held for one hour each at 100° C., 200° C., and 300° C. The film was brittle but clear.

It is thus seen that the present invention yields crystalline polyimides that exhibit properties excellent for the production of high tensile strength, high modulus fibers that should prove useful as reinforcing fibers in high temperature composites and adhesives as well as useful in flame resistant applications.

The above specific examples are considered illustrative of the invention and there may be modifications and variations therein that will be apparent to those skilled in the art without departing from the spirit and scope of the invention as set forth herein.

What is claimed as new and desired to be secured by Letters Patent of the United States is:

1. A crystalline polyimide formed as the reaction product of 4,4'-bis-(3,4-dicarboxyphenoxy)diphenylsulfide dianhydride and p-phenylenediamine.

2. A crystalline polyimide formed as the reaction product of 4,4'-bis-(3,4-dicarboxyphenoxy)diphenylsulfide dianhydride and benzidine.

3. A method of making a crystalline polyimide by reacting 4,4'-bis(3,4-dicarboxyphenoxy)diphenylsulfide dianhydride with a diamine selected from the group consisting of p-phenylenediamine and benzidine.

4. A method of making a crystalline polyimide as in claim 3 wherein the diamine is dissolved in the solvent dimethylacetamide prior to being combined with the dianhydride and the resulting mixture is heated to approximately 40° C. to evaporate the solvent and cyclized by heating to and maintaining the temperature thereof at 100° C. for one hour, at 200° C. for the next one hour, and at 300° C. for the third hour.

* * * * *